(12) United States Patent
Hutchinson et al.

(10) Patent No.: US 8,123,294 B2
(45) Date of Patent: Feb. 28, 2012

(54) HARNESS STORAGE SYSTEM FOR CHILD CAR SEATS

(75) Inventors: James M. F. Hutchinson, Mohnton, PA (US); Michael Gillett, Mohnton, PA (US)

(73) Assignee: Wonderland Nurserygoods Co., Ltd, Taipei (TW)

( * ) Notice: Subject to any disclaimer, the term of this patent is extended or adjusted under 35 U.S.C. 154(b) by 21 days.

(21) Appl. No.: 12/554,642

(22) Filed: Sep. 4, 2009

(65) Prior Publication Data

US 2010/0060052 A1    Mar. 11, 2010

Related U.S. Application Data

(60) Provisional application No. 61/191,607, filed on Sep. 10, 2008.

(51) Int. Cl.
*A47D 1/10* (2006.01)
*A47D 15/00* (2006.01)
*A47C 7/62* (2006.01)

(52) U.S. Cl. ................ 297/250.1; 297/188.07; 297/481

(58) Field of Classification Search .............. 297/250.1, 297/219.12, 188.07, 481, 485
See application file for complete search history.

(56) References Cited

U.S. PATENT DOCUMENTS

| | | | |
|---|---|---|---|
| 4,291,915 A * | 9/1981 | Cox | 190/8 |
| 4,754,999 A | 7/1988 | Kain | 297/256.14 |
| 5,139,311 A * | 8/1992 | Imai et al. | 297/481 |
| 5,286,086 A * | 2/1994 | Gunji | 297/250.1 |
| 5,458,398 A * | 10/1995 | Meeker et al. | 297/250.1 |
| 5,567,007 A * | 10/1996 | Czernakowski et al. | 297/250.1 |
| 6,343,837 B1* | 2/2002 | Gage | 297/250.1 |
| 7,926,874 B2* | 4/2011 | Hendry | 297/256.16 |
| 2002/0043838 A1* | 4/2002 | Yanaka et al. | 297/250.1 |
| 2007/0241596 A1* | 10/2007 | Merrill | 297/250.1 |
| 2009/0066130 A1* | 3/2009 | Shafer et al. | 297/256.16 |
| 2009/0127902 A1* | 5/2009 | Meeker et al. | 297/250.1 |
| 2010/0244516 A1* | 9/2010 | Fiore et al. | 297/250.1 |

* cited by examiner

*Primary Examiner* — Milton Nelson, Jr.
(74) *Attorney, Agent, or Firm* — Miller Law Group, PLLC (57) ABSTRACT

A car seat is formed with a harness storage cavity in the car seat shell for placement of the five-point harness to permit the conversion of the car seat into a belt positioning booster configuration without requiring the harness to be removed from the car seat shell. The headrest and back panel pads on the back rest are removed to provide access to the harness storage cavity which is covered by a hinged door. The harness buckle and the chest clip, still attached to the harness webbing, are placed into the storage cavity and the door closed to provide a flush surface on the seat back so that the child has a smooth supporting surface. The harness webbing projects out of slots to allow the webbing to lie flat beneath the headrest and back panel pads when replaced over the closed door to the storage cavity.

18 Claims, 9 Drawing Sheets

HARNESS STORAGE SYSTEM FOR CHILD CAR SEATS

CROSS-REFERENCE TO RELATED APPLICATIONS

This application claims domestic priority on U.S. Provisional Patent Application Ser. No. 61/191,607, filed on Sep. 10, 2008, the contents of which are incorporated herein by reference.

FIELD OF THE INVENTION

The present invention relates generally to a car seat for use in transporting children in an automobile, and, more particularly, to a five-point harness storage system to allow the car seat to be converted from a car seat for small children to a belt positioning booster for larger children.

BACKGROUND OF THE INVENTION

Car safety seats for children are commercially available in a many configurations corresponding to differences in the age, weight, and size of the child being transported. Parents can choose a car seat that is not only the correct size for their child and their vehicle, but one that also suits their tastes, budget, and life style. As children grow in size and maturity level, they need different kinds of car seats. For example, a child may initially use a rearwardly facing infant car seat, then graduate to a forward facing toddler seat with an integrated harness, and finally to a belt positioning booster seat utilizing the vehicle's lap and shoulder belt system before being able to safely use the vehicle's seat belts alone.

There are many car seats on the market that can be used in multiple configurations. For instance, a forward facing car seat with an integral five-point harness appropriate for a 20-40 pound child might accommodate a child weighing 30-100 pounds as a belt positioning booster seat with the removal of the harness and utilizing the vehicle's lap and shoulder belts. This is convenient for the care giver because it means fewer seats to purchase. Currently available car seats typically have a monolithic shell, i.e. the back and seat cannot be used separately. Some car seats are designed to have a no back base option, but are configured as a separate seat fastened under the monolithic seat and back, such as is disclosed in U.S. Pat. No. 4,754,999, issued on Jul. 5, 1998, to James Kain. The problem with this configuration is the redundancy of seats; one as part of the monolithic shell, and one as a seat only.

States review and regulate restraint age limits and weight requirements. With continuing age and weight increases for recommendations in child restraint safety, a variety of restraint sizes are needed to accommodate the increasing span of children needing car seat safety restraints. The shoulder height and proper placement of belt paths are critical to the safety function of car seat restraints for use with smaller children, but when the car seat is to be utilized as a belt positioning booster, the five-point harness is cumbersome and cannot be simply left on the seat. One option to convert a car seat having a five-point harness to a belt positioning booster is to disconnect the five-point harness from the car seat shell and store the harness at a remote location. Of course, the disconnected harness can be lost, misplaced or accidentally thrown out, preventing the car seat to be reconverted back from the belt positioning booster mode to the car seat configuration.

It would also be desirable to provide a five-point harness storage system that will permit a quick and effective conversion of the car seat into a belt positioning booster without requiring the harness to be removed from the car seat shell.

SUMMARY OF THE INVENTION

It is an object of this invention to overcome the aforementioned disadvantages of the prior art by providing a car seat that can be easily converted into a belt positioning booster configuration without requiring the removal of the five-point harness from the car seat shell.

It is another object of this invention to provide a harness storage system in a child's car seat to allow the five-point harness to be stowed out of the way without requiring the harness to be removed from the car seat shell.

It is a feature of this invention that the shell of the car seat is formed with a storage cavity into which the harness buckle and chest clip assembly can be deployed when the car seat is converted into a belt positioning booster configuration.

It is an advantage of this invention that the five-point harness does not have to be removed from the car seat shell to allow the car seat to be converted into a belt positioning booster configuration.

It is another feature of this invention that the storage cavity is constructed with a hinged door to cover the storage cavity when the car seat is in use in any configuration.

It is another advantage of this invention that the storage of the five-point harness within the car seat shell will prevent the harness from being lost in the event re-configuration of the belt positioning booster back to a car seat is needed.

It is still another advantage of this invention that the conversion of the belt positioning booster into a car seat configuration can be accomplished quickly and easily without requiring a the five-point harness to be retrieved from a remote location.

It is still another object of this invention to provide a method of converting a car seat between a car seat configuration and a belt positioning booster configuration.

It is still another feature of this invention that the method of conversion includes a re-positioning of the five-point harness into a storage cavity formed into the car seat shell to hide the harness from view.

It is yet another feature of this invention that the harness belts project out of the harness storage cavity so that the harness belts can be retained on the car seat shell.

It is yet another advantage of this invention that only the chest clip and the harness buckle are located within the harness storage cavity.

It is yet another advantage of this invention that the re-conversion of the car seat from a belt positioning booster into a car seat configuration will not risk an improper connection of the five-point harness onto the car seat shell.

It is a further feature of this invention that the five-point harness is never disconnected from the car seat shell to convert the car seat into a belt positioning booster configuration.

It is a further advantage of this invention that the closed door over the harness storage cavity provides a smooth back support surface for the child in both the car seat and belt positioning booster configurations.

It is yet another object of this invention to provide a harness storage system for a car seat shell to permit the conversion of the car seat into a belt positioning booster, which is durable in construction, inexpensive to manufacture, carefree of maintenance, facile in assemblage, and simple and effective in use.

These and other objects, features and advantages are accomplished according to the instant invention by providing a car seat formed with a harness storage cavity in the car seat shell for placement of the five-point harness to permit the conversion of the car seat into a belt positioning booster configuration without requiring the harness to be removed from the car seat shell. The headrest and back panel pads on the back rest are removed to provide access to the harness storage cavity which is covered by a hinged door. The harness buckle and the chest clip, still attached to the harness webbing, are placed into the storage cavity and the door closed to provide a flush surface on the seat back so that the child has a smooth supporting surface. The harness webbing projects out of slots to allow the webbing to lie flat beneath the headrest and back panel pads when replaced over the closed door to the storage cavity.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENT

Referring now to FIGS. 1-8, a car seat incorporating the principles of the instant invention can best be seen. The car seat 10 is constructed to include a generally horizontal seat member 12, a generally vertical back rest 13 projecting upwardly from the rear portion of the seat member 12, and preferably a pair of arm rests 14 on the laterally opposing sides of the seat member 12. The car seat 10 can also include a head rest 15 that is mounted on the upper portion of the seat back 13 and can be vertically positionally adjustable relative to the seat back 13 to accommodate and properly support growing children. The car seat 10 is generally formed with a rigid shell 16 defining the eternal surfaces of the car seat 10 but padding is mounted on the shell 16 to provide a soft surface on which the child is supported while seated in the car seat 10. The padding includes, among others, a head rest pad 17, a back panel pad 18 and a seat pad 19.

Figure 1:
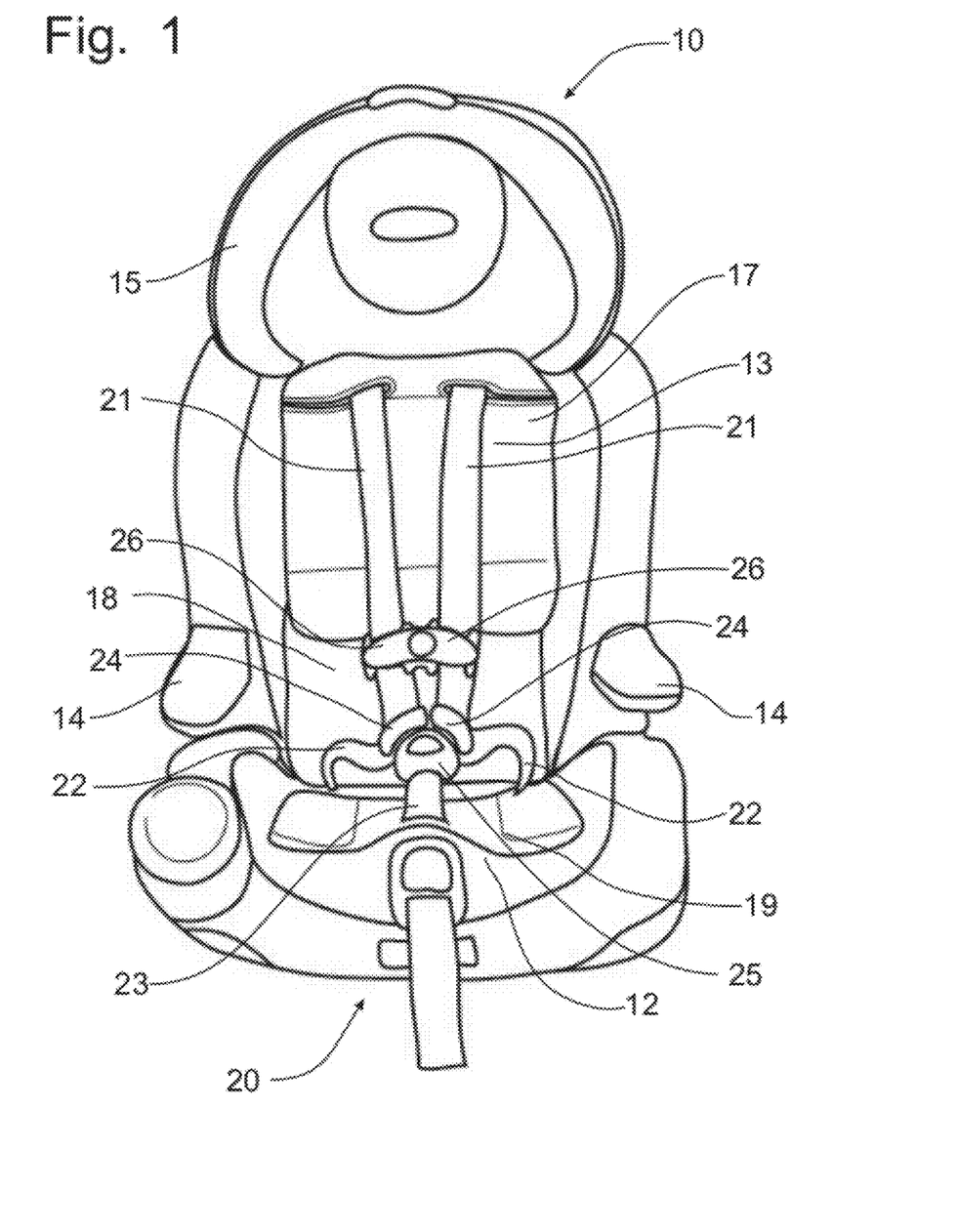
FIG. 1 is a front elevational view of a car seat incorporating the principles of the instant invention, the car seat being placed in a car seat mode of operation with a five-point harness exposed for utilization to secure a small child.

The car seat 10 is provided with a harness, for example a five-point harness 20 that includes a pair of generally vertically oriented shoulder straps 21 connected to the shell 16 at the back rest 13, a pair of generally horizontally oriented belt straps 22 connected to the shell 16 at the rear of the seat member 12, and a crotch strap 23 that is coupled to the shell 16 at the forward portion of the seat member 12. One skilled in the art will recognize that the shoulder strap 21 and the belt strap 22 on each respective side of the car seat 10 are formed from a single harness web that has a opposing ends connected to the seat shell 16 at appropriate locations. Each harness web forming a shoulder strap 21 and a corresponding belt strap 22 has mounted thereon a latch member 24 and a chest clip 26. The crotch strap terminates in a harness buckle 25, which can be positionally adjusted to accommodate a growing child. When fastened around a child to secure the child in the car seat 10, the chest clips 26 are connected together to interconnect the shoulder straps 21 and the latch members 24 are snapped into engagement with the harness buckle 25 to secure the shoulder straps 21 and the belt straps 22 to the crotch strap 23 and complete the five-point harness connection.

The car seat 10 is shown in FIG. 1 in its car seat configuration with the five-point harness 20 available for securing small children into the car seat 10. When the child grows to an adequate age and size, according to state regulations, the child can be positioned in a booster seat so that the child can be positioned high enough for proper engagement and support from the vehicle's seat and shoulder belts. The car seat 10 can be utilized as a belt positioning booster, but the five-point harness 20 would not be used in such a configuration and if the harness 20 were simply left on the padding behind the child, the child would have an uncomfortable seat and would not be provided with a smooth supporting surface on which the child may be secured for transportation in the vehicle.

Figure 5:
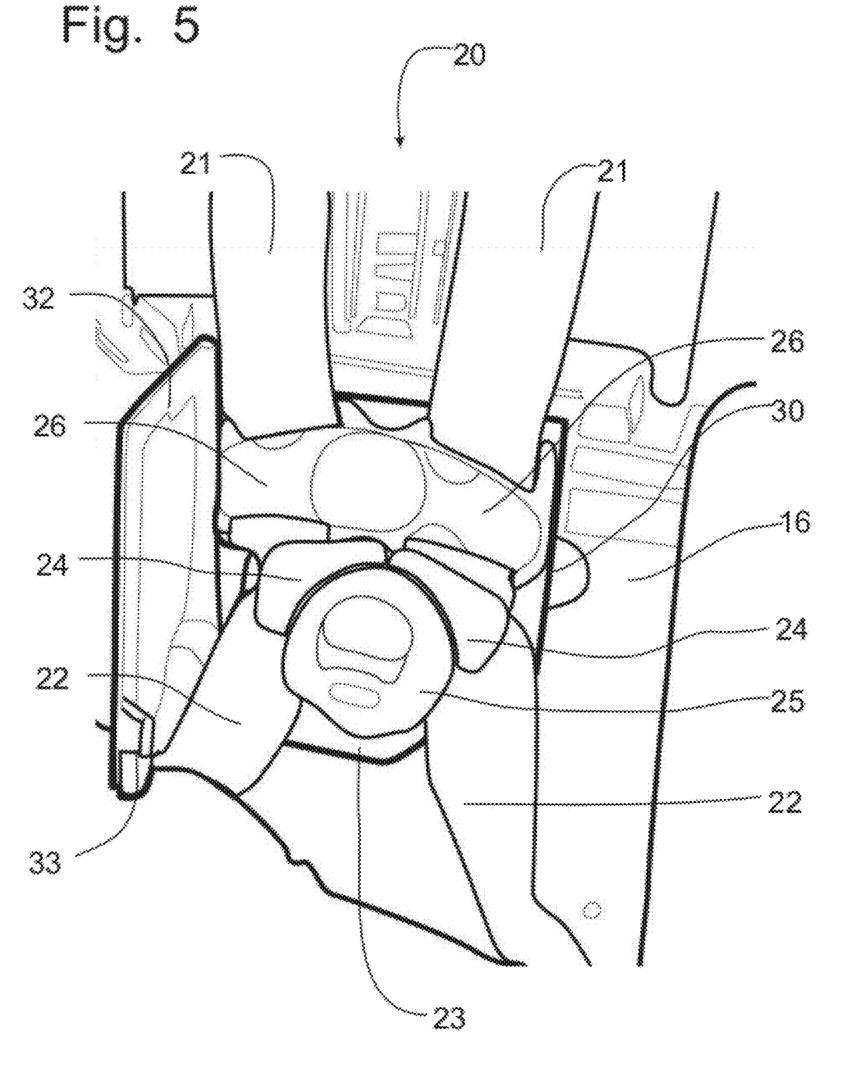
FIG. 5 is an enlarged front elevational view of the lower part of the back rest with the back panel pad removed and the hinged door opened to permit the placement of the harness buckle and the chest clip into the opened harness storage cavity.
Figure 5A:
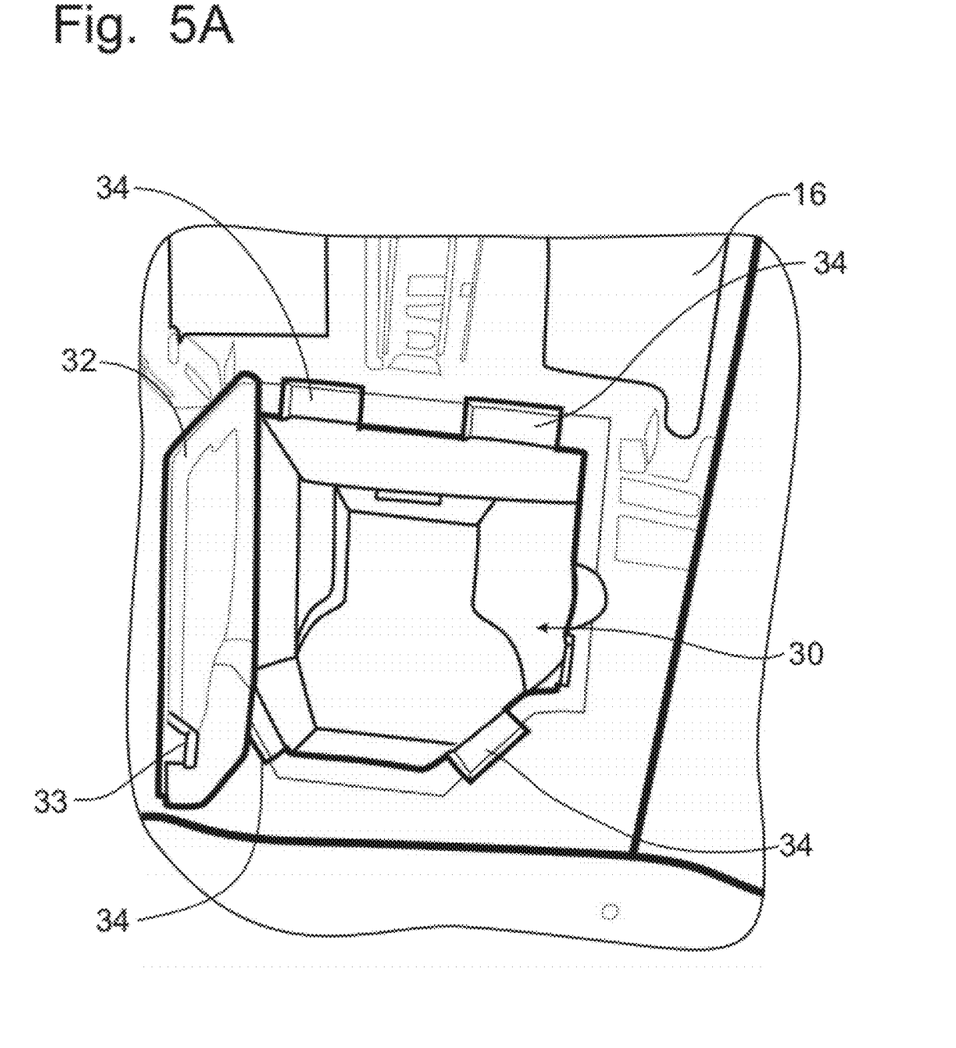
FIG. 5A is an enlarged front elevational view similar to that of FIG. 5 to show the harness storage cavity, the harness being broken away for purposes of clarity in depicting the harness storage cavity.

To accommodate the five-point harness 20, the shell 16 of the back rest 13 is formed with a harness storage cavity 30 in the lower, central portion thereof, as is best seen in FIGS. 5 and 5A. The harness storage cavity 30 is formed to receive the latch members 24, the harness buckle 25 and the chest clips 26 therein. A cover 32, preferably in the form of a hinged door, though other attachment concepts, such as hook and loop fasteners, friction fit, etc., could also be applied to the cover 32 to make it selectively removable from the shell 16 to expose the harness storage cavity 30 under the cover 32. As best seen in FIGS. 5 and 5A, the door 32 is preferably formed with a deflector latch 33 that is arranged to engage the shell 16 when the door 32 is closed to secure the door 32 in place against the shell 16. The harness storage cavity 30 is also formed with slots 34 in the top and bottom areas for passage of the harness webbing members 21, 22, which will remain connected to the harness buckle 25, latch members 24 and chest clips 26, as will be described in greater detail below.

Figure 2:
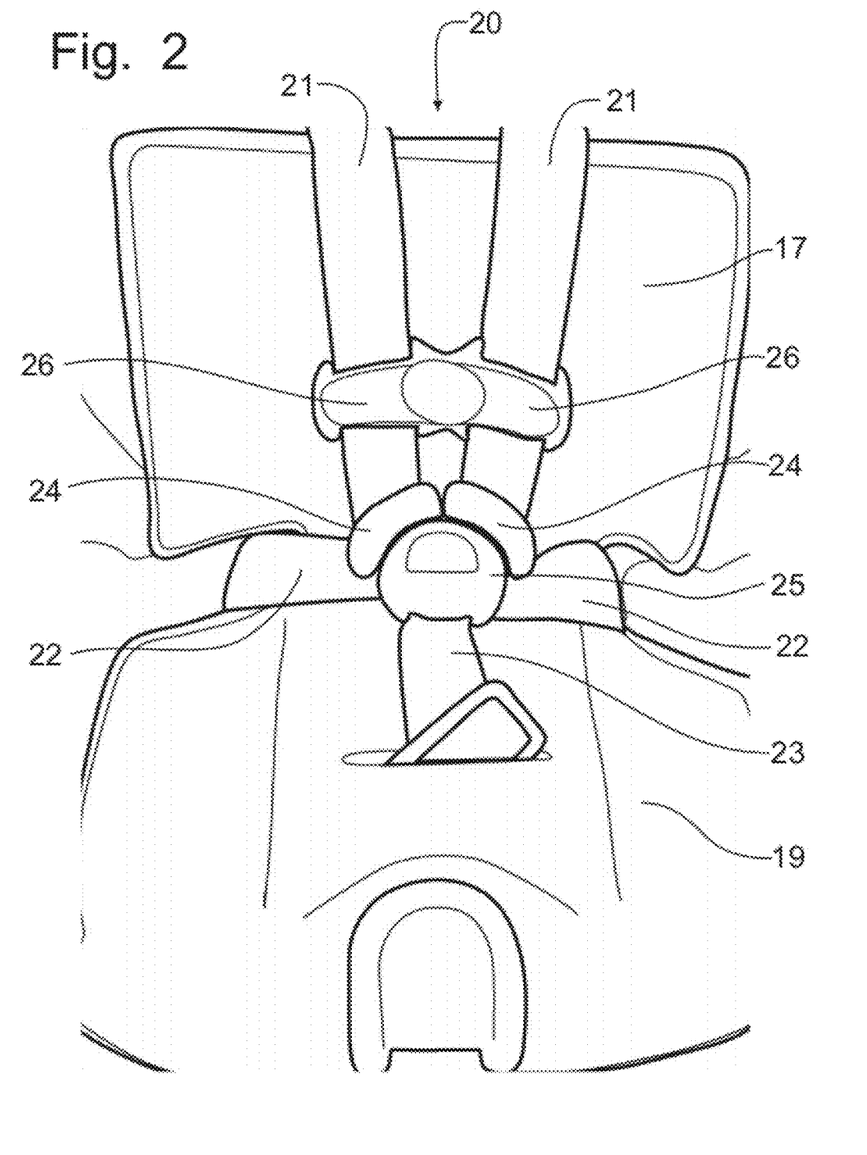
FIG. 2 is an enlarged partial front elevational view of the seat portion of the car seat to depict the disconnection of the crotch harness from the car seat shell to start the conversion of the car seat into a belt positioning booster configuration.
Figure 8:
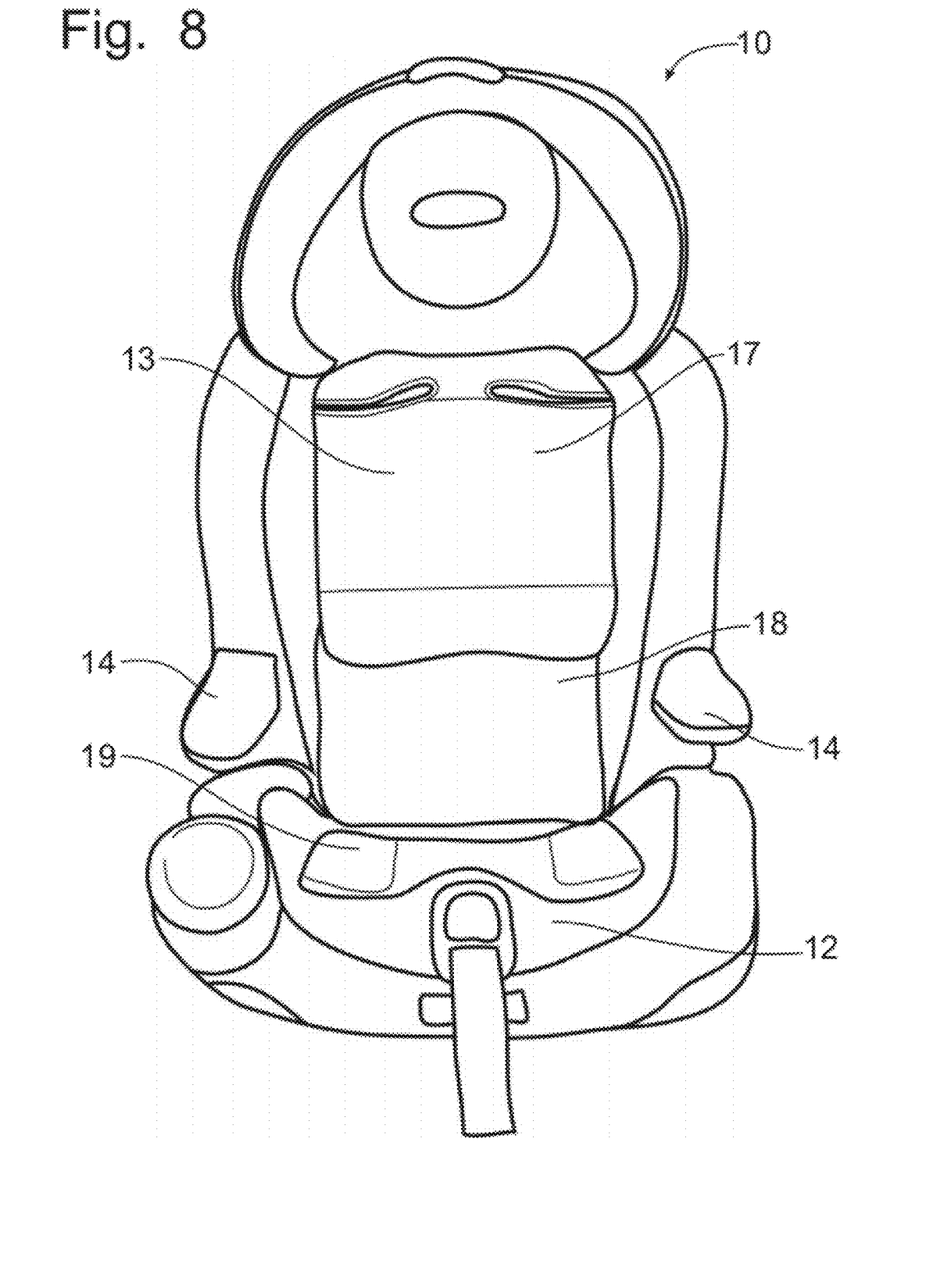
FIG. 8 is a front elevational view of the car seat with the conversion into the belt positioning booster configuration completed.

To convert the car seat from the car seat configuration shown in FIG. 1 to the belt positioning booster configuration shown in FIG. 8, the harness 20 is stored in the harness storage cavity 30. The first step, as depicted in FIG. 2, is to remove the crotch strap 23 from the forward portion of the seat shell 16.

Figure 3:
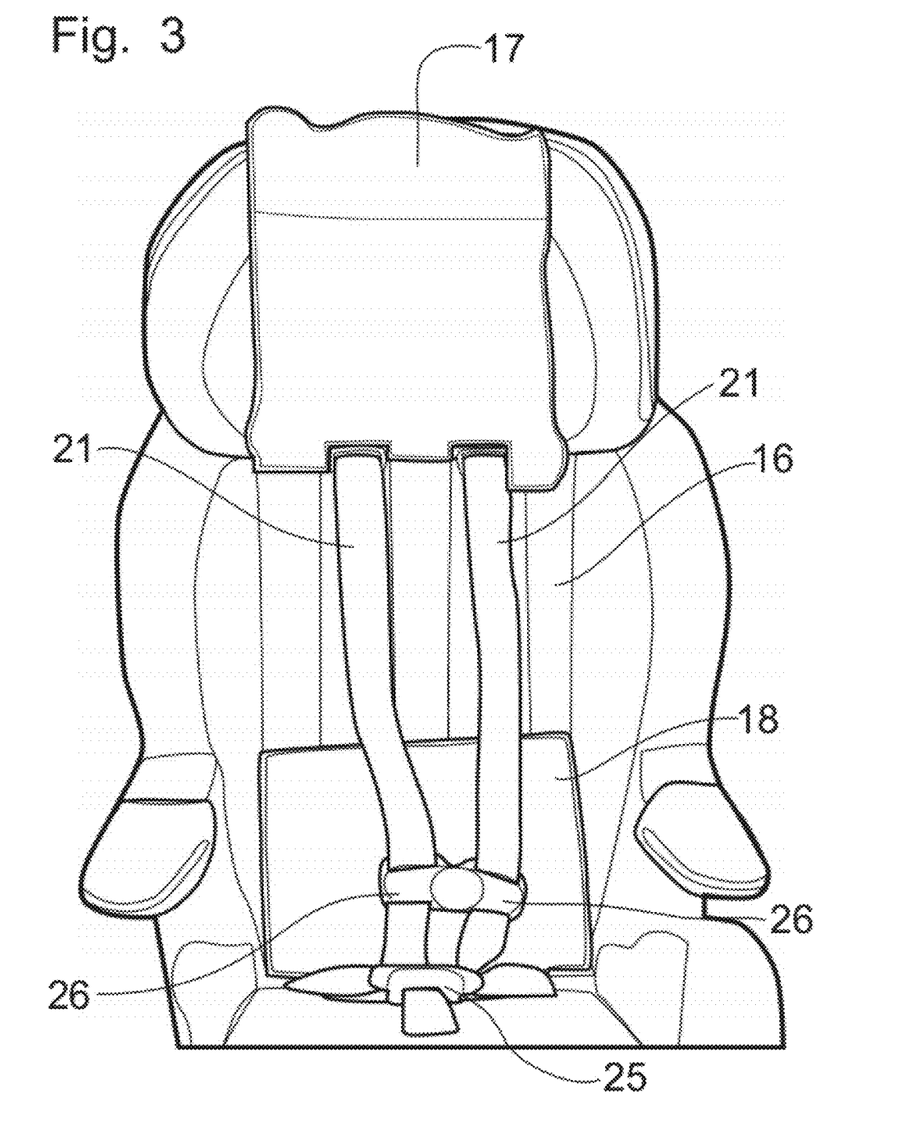
FIG. 3 is a partial front elevational view of the car seat to depict the step of disconnecting and raising the head rest pad to permit a re-positioning of the harness webbing.

In the alternative, the crotch strap 23 can be lengthened and passed underneath the seat pad 19 to exit at the rear of the seat pad 19 so that the harness buckle 25 can reach the harness storage cavity 30. In most situations, the crotch strap 23 is most easily disconnected from the seat shell 16. The head rest pad 17 is then loosened from the other adjacent padding members and folded upwardly over the head rest 15, or the back of the back rest 13, as is depicted in FIG. 3. The movement of the head rest pad 17 positions the shoulder straps 21 against the back rest shell 16.

Figure 4:
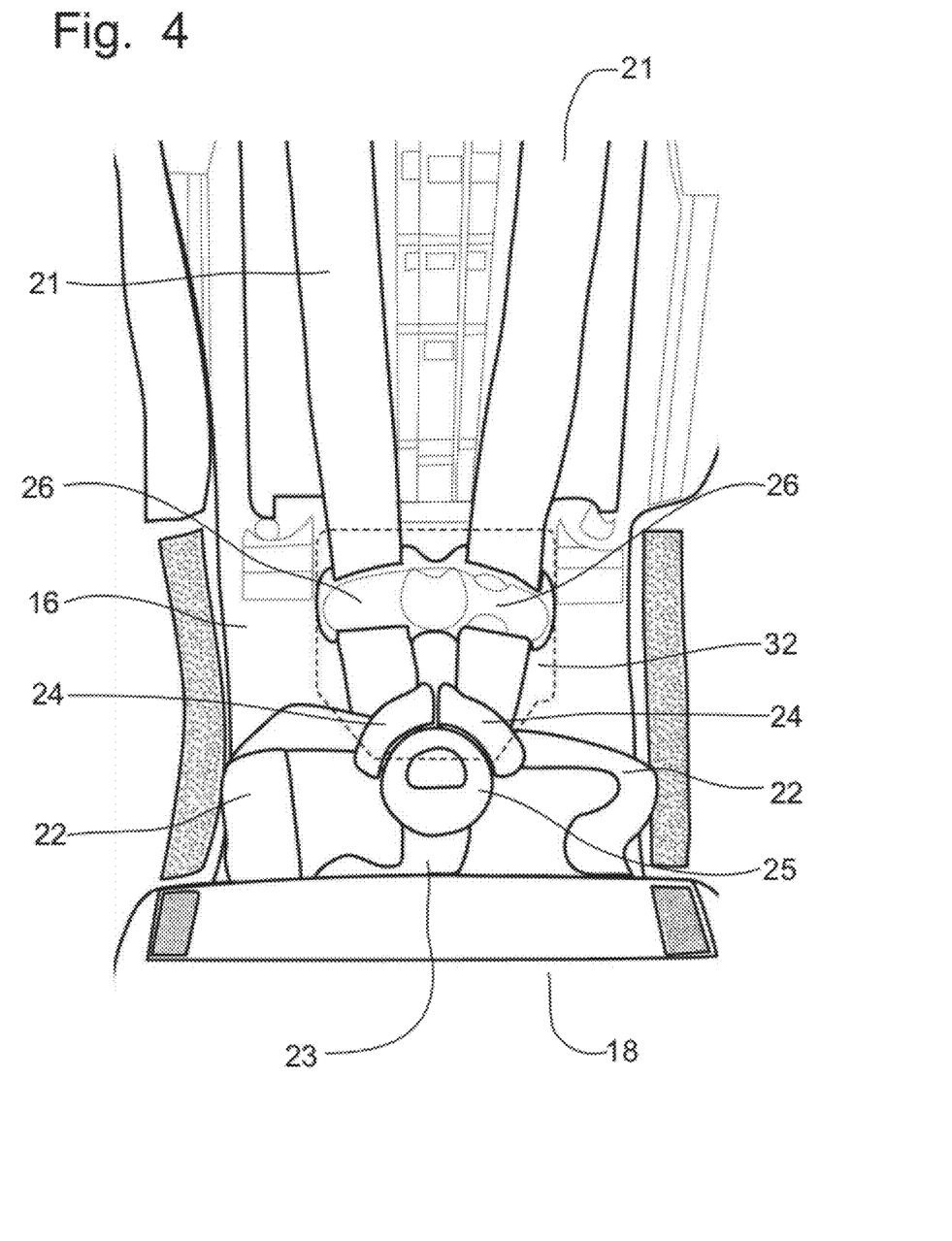
FIG. 4 is an enlarged partial front elevational view of the car seat to depict the disconnection and displacement of the back panel pad to gain access to the harness storage cavity formed into the car seat shell in the back rest.

As best seen in FIGS. 3 and 4, the back panel pad 18 is loosened from the adjacent padding members and either removed, or preferably, folded over onto the seat pad 19. The removal of the back panel pad 18 results in the belt straps 22 being positioned against the back rest shell 16. The respective chest clips 26 are connected together to draw the shoulder straps 21 inwardly toward the center of the back rest 13, and the latch members 24 are clipped into engagement with the harness buckle 25.

As reflected in FIG. 5, the cover 32 over the harness storage cavity 30 is removed, or in the preferred embodiment opened against the hinges to expose the harness storage cavity 30 formed in the back rest 13. As shown in FIGS. 5 and 5A, the harness storage cavity 30 can be configured as a generally rectangular cavity having a size that will accommodate the receipt of both the connected chest clips 26 and the connected latch members 24 and harness buckle 25. Alternative, the storage cavity 30 can be formed in specific shapes to register with the shape of the connected chest clips 26 and the connected latch members 24 and harness buckle 25, so that the closure of the cover 32 would trap these harness components securely within the harness storage cavity. At the upper left and right corners and at the lower left and right corners, the storage cavity 30 is formed with slots 34 that are sized to receive and allow the passage of the shoulder straps 21 and the belt straps 22, respectively, from the harness storage cavity 30.

Figure 6:
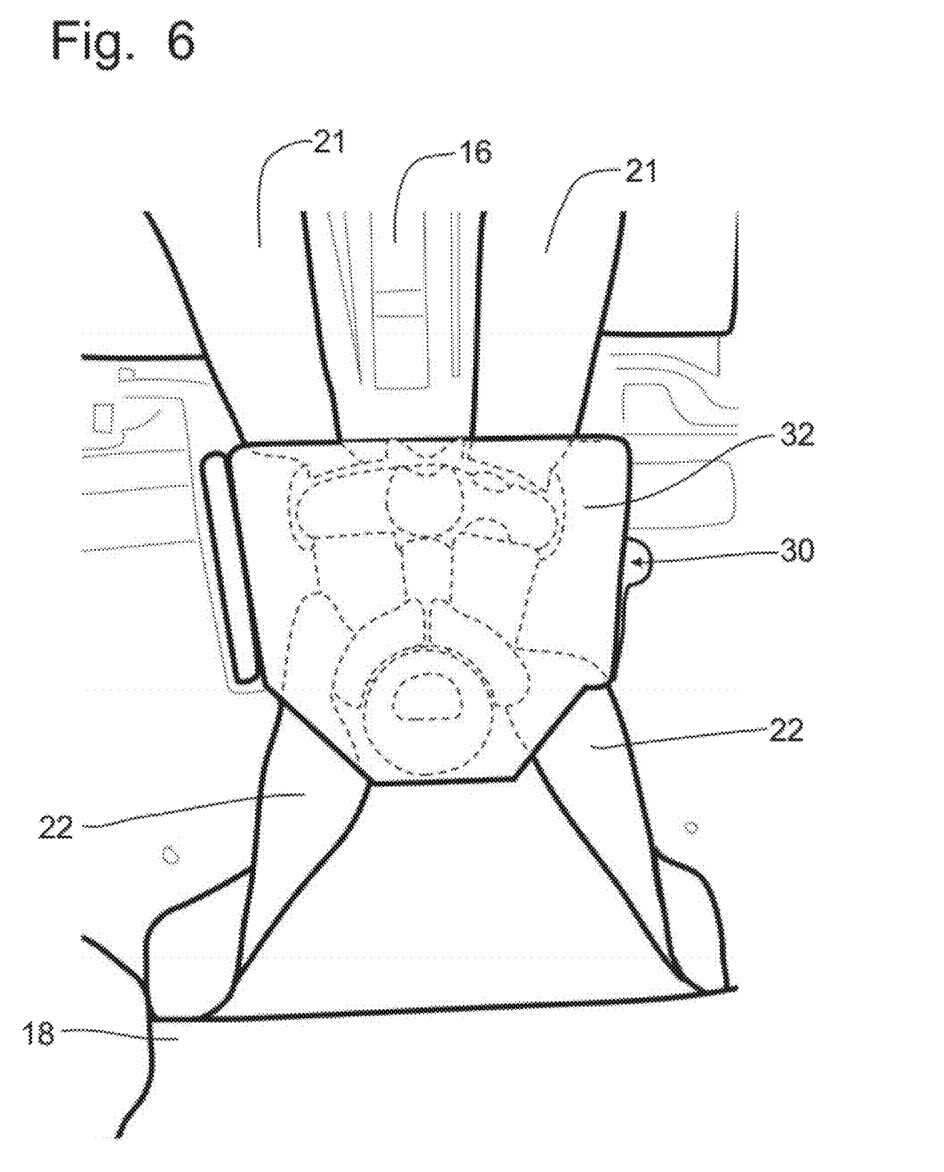
FIG. 6 is an enlarged front elevational view similar to that of FIG. 5 but with the harness buckle and chest clip stowed in the harness storage cavity with the hinged door closed to provide a smooth back rest support surface, the harness webbing projecting out of slots formed in the respective corners of the storage cavity.
Figure 7:
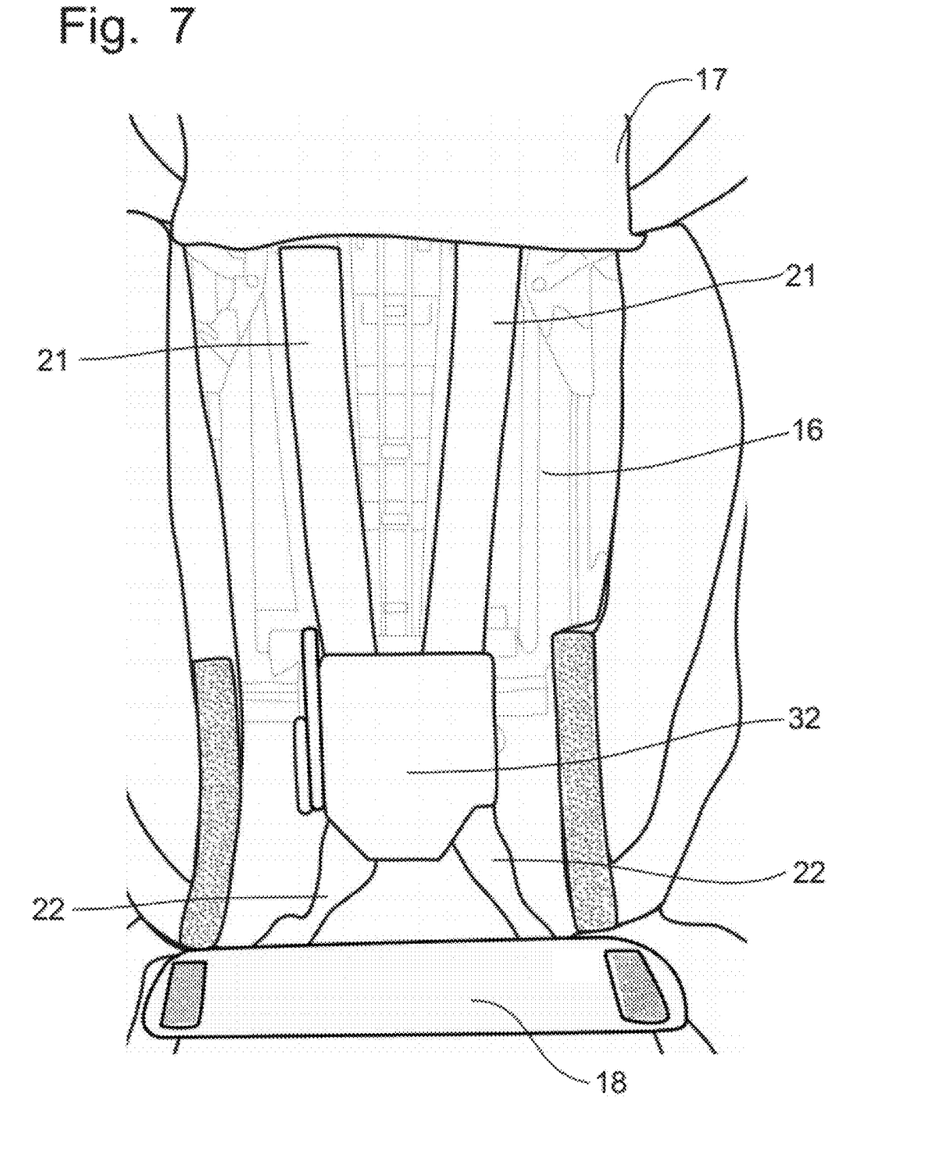
FIG. 7 is a front elevational view of the car seat with the pads removed to shown the storage of the harness into the harness storage cavity before the pads are replaced.

As a result, as best seen in FIGS. 6 and 7, the closure of the door 32 against the shell 16 hides the chest clips 26, the latch members 24 and engaged harness buckle 25 internally of the harness storage cavity 30 with the shoulder straps 21 and belt straps 22 projecting out of the storage cavity 30 at the top and bottom thereof. Tightening of the straps 21, 22, positions the shoulder straps 21 and the belt straps 22 against the shell 16. The crotch strap 23 can be rolled into the harness storage cavity 30 with the harness buckle 25 if disconnected from the seat shell 16. With the door 32 closed, the seat back again provides a smooth support surface against which a child can be seated for comfortable transportation. Replacement of the back panel pad 18 and then the head rest pad 17 completes the covering of the harness webbing and presents a clean belt positioning booster configuration devoid of the five-point harness 20, as can be seen in FIG. 8.

The re-conversion of the belt positioning booster configuration to the car seat configuration is done in the same manner as above, only to remove the harness 20 from storage in the shell 16. As noted above, the head rest pad 17 and the back panel pad 18 are disconnected from the adjacent padding members and moved aside to expose the shell 16 and the closed cover 32. The door 32 is then opened to expose the stored chest clips 26, latch members 24 and harness buckle 25, which are withdrawn from the harness storage cavity 30. The belt straps 22 are then worked around the back panel pad 18 so that the back panel pad 18 can be re-connected to the adjacent padding with the belt straps 22 on the outside of the back panel pad 18. The same re-positioning is done with the shoulder straps 21 and the head rest pad 17 replaced with the shoulder straps 21 on the outside of the head rest pad 17. The crotch strap 23 is then reconnected to the front portion of the seat shell 16, and all straps 21-23 adjusted in length to accommodate the child to be secured into the car seat by the now functioning five-point harness 20.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A car seat for transporting a child in an automobile, comprising:
    seat member having a first portion of a rigid shell;
    a back rest projecting upwardly from a rear portion of said seat member and having a second portion of said rigid shell;
    a harness including a pair of laterally spaced shoulder straps supported at one end from said rigid shell and terminating at an opposing end as belt straps supported from said rigid shell, said harness also including a crotch strap connected to said first portion of said rigid shell, said harness further including a pair of latch members, each said latch member being connected to one of said shoulder straps, said latch members being engagable with a harness buckle connected to said crotch strap; and
    a harness storage cavity formed in said rigid shell and including a cover forming a smooth support over said harness storage cavity, said harness storage cavity being sized to receive said latch members and said harness buckle below said cover, said harness cavity further being formed with slots to permit said shoulder straps and said belt straps to project from said harness storage cavity when said cover is closed and said harness buckle and said latch members are positioned within said harness storage cavity.

2. The car seat of claim 1 further comprising:
    a back panel pad and a head rest pad being supported on said rigid shell, each of said back panel pad and said head rest pad being selectively removable from said rigid shell; and
    each said latch member being connected to one of said shoulder and the corresponding said belt strap, said shoulder straps and said belt straps being positionable behind said back panel pad and said head rest pad and against said rigid shell to permit said harness to be stored in said harness storage cavity with said shoulder straps and said belt straps projecting out of said harness storage cavity along said rigid shell.

3. The car seat of claim 2 wherein said cover is a hinged door having a latch member engagable with said rigid shell to secure said door in a closed position against said rigid shell.

4. The car seat of claim 2 wherein said harness storage cavity is located in said back rest, said harness further including a chest clip engaged with each said shoulder strap, said chest clips being engagable with one another to secure said shoulder straps together, said harness storage cavity being sized to receive said chest clips within said harness storage cavity with said latch members and said harness buckle.

5. The car seat of claim 4 wherein said chest clips are engaged and said latch members are engaged with said harness buckle before being placed into said harness storage cavity for storage therein.

6. In a car seat having a seat back supported on a seat member and projecting upwardly therefrom, said seat member having a first portion of a rigid shell and a seat pad mounted on the rigid shell, said back rest having a second portion of a rigid shell on which a back panel pad and a head rest pad are supported, each of said back panel pad and said head rest pad being selectively removable from said rigid shell; and a harness including a pair of laterally spaced shoulder straps supported from said rigid shell, a pair of laterally spaced belt straps connected to said rigid shell, and a crotch strap connected to said rigid shell, said harness including a pair of latch members, each said latch member being connected to one of said shoulder straps and to a corresponding said belt strap, both said latch members being engagable with a harness buckle connected to said crotch strap, the improvement comprising:

a harness storage cavity formed in said rigid shell and including a cover forming a smooth support when closed over said harness storage cavity, said harness storage cavity being sized to receive said latch members or said harness buckle, said shoulder straps and said belt straps are positionable behind said back panel pad and said head rest pad and against said rigid shell to permit said latch members or said harness buckle to be stored in said harness storage cavity with said shoulder straps and said belt straps projecting out of said harness storage cavity along said rigid shell.

7. The car seat of claim 6 wherein each said shoulder strap and a corresponding belt strap are formed from a single piece of webbing having one of said latch members mounted thereon, each said piece of webbing forming a shoulder strap and corresponding belt strap further including a chest clip mounted on said shoulder strap for engagement with the chest clip on the opposing said shoulder strap to secure said shoulder straps together.

8. The car seat of claim 7 wherein said harness storage cavity is sized to receive said chest clips within said harness storage cavity with said latch members.

9. The car seat of claim 8 wherein said chest clips are engaged and said latch members are engaged with said harness buckle before being placed into said harness storage cavity for storage therein.

10. The car seat of claim 6 wherein said harness storage cavity being formed with slots to permit the passage of said shoulder straps and said belt straps from said harness storage cavity.

11. The car seat of claim 10 wherein said cover is a hinged door having a latch member engagable with said rigid shell to secure said door in a closed position against said rigid shell.

12. A child car seat for transporting a child in an automobile having a vehicle belt comprising:

a seat member and a back rest connected to said seat member;

a harness including a pair of laterally spaced shoulder straps supported from said back rest and a crotch strap supported on said seat member, a pair of latch members mounted on said shoulder straps, respectively, and a harness buckle connected to said crotch strap; and a harness storage cavity formed as a recess in said child car seat and including a cover forming a smooth support over said harness storage cavity, said harness storage cavity being sized to receive at least one of said harness buckle and said latch members below said cover, said child car seat being convertible between a car seat configuration in which said latch members are connectable to said harness buckle for securing said child on said child car seat, and a belt positioning booster configuration in which at least said latch members or said harness buckle are stored within said harness storage cavity with said shoulder straps and said belt straps projecting out of said harness storage cavity through slots formed in said harness storage cavity when said cover is closed and said harness buckle and said latch members are positioned within said harness storage cavity so that said child can be secured to the child seat via the vehicle belt.

13. A method of converting a car seat from a car seat configuration into a belt positioning booster configuration, said car seat having a first portion of a rigid shell and a seat pad mounted on the first portion of said rigid shell, a back rest having a second portion of said rigid shell on which a back panel pad and a head rest pad are supported, each of said back panel pad and said head rest pad being selectively removable from said rigid shell; and a harness including a pair of laterally spaced shoulder straps connected to said rigid shell, a pair of laterally spaced belt straps connected to said rigid shell, and a crotch strap supported from said rigid shell, said harness including a pair of latch members, each said latch member being connected to one of said shoulder straps and a corresponding said belt strap, both said latch members being engagable with a harness buckle connected to said crotch strap, comprising the steps of:

storing said harness buckle and said latch members in a harness storage cavity formed as a recess in said rigid shell, including the steps of:

opening a cover to provide access to said harness storage cavity;

placing said latch members and said harness buckle into said harness storage cavity; and closing said cover over said harness storage cavity to conceal said harness buckle and latch members behind said cover; and locating all of said straps projecting from slots formed in said harness storage cavity between said pads and said rigid shell to conceal said harness behind said pads.

14. The method of claim 13 wherein said locating step includes the steps of:

repositioning said shoulder straps and said belt straps behind said head rest pad and said back panel pad to be located against said rigid shell.

15. The method of claim 14 wherein said locating step further includes the step of:

disconnecting said crotch strap from said first portion of said rigid shell; and positioning said crotch strap within said harness storage cavity with said harness buckle.

16. The method of claim 14 wherein said harness further includes a chest clip attached to each said shoulder strap, said storing step further including the step of:

setting said chest clips into said harness storage cavity with said latch members and said harness buckle.

17. The method of claim 16 wherein said storing step further includes the steps of:

attaching said chest clips together before said setting step; and connecting said latch members to said harness buckle before said placing step.

18. The method of claim 17 wherein said shoulder straps and said belt straps project from said harness storage cavity through slots formed in said harness storage cavity beneath said cover.

* * * * *